(12) United States Patent
Harrison et al.

(10) Patent No.: US 9,390,376 B2
(45) Date of Patent: Jul. 12, 2016

(54) DISTRIBUTED MACHINE LEARNING INTELLIGENCE DEVELOPMENT SYSTEMS

(71) Applicant: LOCKHEED MARTIN CORPORATION, Bethesda, MD (US)

(72) Inventors: Gregory A. Harrison, Oviedo, FL (US); Eric W. Worden, Orlando, FL (US); Jonathan Charles Brant, Orlando, FL (US); David A. Smith, Cary, NC (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 296 days.

(21) Appl. No.: 14/053,811

(22) Filed: Oct. 15, 2013

(65) Prior Publication Data

US 2015/0106308 A1    Apr. 16, 2015

(51) Int. Cl.
*G06N 99/00* (2010.01)
*G06N 5/04* (2006.01)
*G06N 3/12* (2006.01)

(52) U.S. Cl.
CPC ............... *G06N 5/043* (2013.01); *G06N 3/126* (2013.01)

(58) Field of Classification Search
None
See application file for complete search history.

(56) References Cited

U.S. PATENT DOCUMENTS

| | | | | |
|---|---|---|---|---|
| 6,061,675 A | * | 5/2000 | Wical | G06F 17/271 704/10 |
| 6,199,034 B1 | * | 3/2001 | Wical | G06F 17/2785 704/9 |
| 6,741,974 B1 | * | 5/2004 | Harrison | G06N 5/022 706/13 |
| 8,200,610 B1 | | 6/2012 | Birch et al. | |
| 2006/0224535 A1 | | 10/2006 | Chickering et al. | |
| 2006/0248031 A1 | | 11/2006 | Kates et al. | |
| 2009/0326947 A1 | * | 12/2009 | Arnold | G10L 15/26 704/257 |
| 2011/0191273 A1 | * | 8/2011 | Grabarnik | G06N 5/02 706/12 |
| 2015/0106308 A1 | * | 4/2015 | Harrison | G06N 5/043 706/12 |

FOREIGN PATENT DOCUMENTS

EP    2863340 A2 *   4/2015   ............. G06N 3/126

OTHER PUBLICATIONS

Mario Gomez Martinez, "Open, Reusable and Configurable Multi Agent Systems: A knowledge Modelling Approach," Thesis, Universitat Politècnica de València, Jan. 2004.*
Atencia et al., "A Formal Semantics forWeighted Ontology Mappings," In Cudre-Mauroux et al. Lecture Notes in Computer Science, vol. 7649, pp. 13-17.*

(Continued)

*Primary Examiner* — Kakali Chaki
*Assistant Examiner* — Fuming Wu
(74) *Attorney, Agent, or Firm* — Terry M. Sanks, Esq.; Beusse Wolter Sanks & Maire, PLLC

(57) ABSTRACT

A system, method, and computer-readable instructions for a distributed machine learning system are provided. A plurality of distributed learning environments are in communication over a network, wherein each environment has a computing device having a memory and a processor coupled to the memory, the processor adapted implement a learning environment via one or more agents in a rules-based system, wherein the agents learn to perform tasks in their respective learning environment; and a persistent storage in which knowledge comprising a plurality of rules developed by the agents for performing the tasks are stored, wherein the knowledge is tagged and shared with other agents throughout the plurality of distributed learning environments.

20 Claims, 7 Drawing Sheets

(56) References Cited

OTHER PUBLICATIONS

Martinez, "Open, Reusable and Configurable Multi-Agent Systems: A knowledge Modelling Approach," Thesis, Jan. 2004.*

Tsai, "A spatial mediator model for integrating heterogeneous spatial data" by Tsai (Graduate Theses and Dissertations. Paper 10285. Iowa State University, 2011).*

T. Kraska, A. Talwalkar, J.Duchi, R. Griffith, M. Franklin, M.I. Jordan. MLbase:A Distributed Machine Learning System. In Conference on Innovative Data Systems Research, 2013.

A. Talwalkar, T. Kraska, R. Griffith, J. Duchi, J. Gonzalez, D. Britz, X. Pan, V. Smith, E. Sparks, A. Wibisono, M. J., Franklin, M. I., Jordan. MLbase: A Distributed Machine Learning Wrapper. In Big Learning Workshop at NIPS, 2012.

Martinez, Mario Gomez, Open, Reusable and Configurable Multi Agent Systems: A Knowledge Modelling Approach, Jun. 15, 20014, XP055181589, URL:http://hdl.handle.net/10803/3049.

Harrison et al., "Genetically Programmed Learning Classifier System Description and Results," GECCO-07, Jul. 7-11, 2007, London England, UK, pp. 2729-2736.

Kallel et al., "MAGAD-BFS: A Learning Method for Beta Fuzzy Systems Based on a Multi-Agent Genetic Algorithm," Soft Computing; A Fusion of Foundations, Methodologies and Applications, Springer, Berlin, DE, vol. 10, No. 9, Oct. 7, 2005, pp. 757-772.

International Search Report, Apr. 16, 2015.

* cited by examiner

| VERB | ADJECTIVE – $10 | NOUN |
|---|---|---|
| DO – $10 | COLOR – $30 | THING – $10 |
| LOOK – $20 | GREEN – $40 | UNNATURAL |
| FIND – $30 | | PHENOMENON |
| DETECT – $35 | | HUMAN BUILT – $25 |
| | | OPTICS – $40 |
| | | LASER – $50 |

DISTRIBUTED MACHINE LEARNING INTELLIGENCE DEVELOPMENT SYSTEMS

BACKGROUND

Evolution of machine learning intelligence can take an extended amount of computing power, and requires a large amount of interaction with an accurate simulation of the environment or actual environmental interaction in order to explore potential solutions, find more novel cases in which to try to develop new solutions, and try tested solutions against. Parallel computation helps, but the knowledge may be different and represented in different ways in each individual computation, requiring that extra steps be taken to integrate the knowledge between the different parallel computations. Moreover, the operational environment may be dynamic and changing and may even be a Complex Adaptive System (CAS).

Machine learning systems tend to develop localized solutions that may not be shared. Genetics-based Learning Classifier Systems develop sets of rules that are tightly linked. The rules are tightly coupled through message lists, are in a careful balance of sensed and internal conditions, and can self modify as new knowledge is learned. Thus the rules are difficult to share between intelligent agents, and may be deleted when the program is stopped. The development of intelligent agents through machine learning requires a machine learning environment. This can be a large scale simulation, requiring at least one computer, or more. The results from one learning system currently cannot be shared with another.

Genetically programmed systems will create programs of operation that are influenced by the environment, whether a software-based environment or an external world sensed through some mechanism. These programs may be very detailed and specific to a particular model of robot or intelligent agent. The knowledge that it has learned that enabled it to write its own program and function at a high level of fitness may be saved only internally to the individual robot, or not at all. One such example is of a genetically programmed Learning Classifier Systems (LCS) for Complex Adaptive Systems (CAS) as described in U.S. Pat. No. 6,741,974 "Genetically Programmed Learning Classifier System for Complex Adaptive System processing with agent-based architecture" assigned to the assignee hereof. The disclosure of the '974 patent is hereby incorporated herein by reference. In CAS, agents are designed to perceive their environment through its detectors and take action on its perception through its effectors. Obviously, genetically programmed systems are different from systems where the robot or intelligent agent is programmed by a human, as the human can test and distribute the program as a software update. But the intelligent agent has to test and develop its software automatically, if it is equipped with machine learning.

A number of technologies exist for genetically programmed systems, machine learning, and distributed machine learning. For example, policy learning systems can learn a policy to go from state to state that can be shared, but this is limited to smaller, stable systems and is not suitable for large scale knowledge representation. GPU methods can speed operations when working on a data set with a fixed architecture, but are not amenable to automatically changing programs. Some searching algorithms are parallelizable to different machines, and the results grouped later. Other examples include: MLbase (T. Kraska, A. Talwalkar, J. Duchi, R. Griffith, M. Franklin, M. I. Jordan. *MLbase: A Distributed Machine Learning System*. In Conference on Innovative Data Systems Research, 2013; and A. Talwalkar, T. Kraska, R. Griffith, J. Duchi, J. Gonzalez, D. Britz, X. Pan, V. Smith, E. Sparks, A. Wibisono, M. J., Franklin, M. I., Jordan. *MLbase: A Distributed Machine Learning Wrapper*. In Big Learning Workshop at NIPS, 2012), U.S. Patent Application Nos. 20060224535, 20060248031, and U.S. Pat. Nos. 6,741,974 and 8,200,610. These solutions generally distribute raw data or knowledge or search through it. However, none of these solutions provide for an actionable program that is capable of joining with other local programs to create a higher fitness program, nor do they provide for continuously-adaptable genetic-programming-based learning, especially at the Complex Adaptive Systems (CAS) level.

If intelligent agents could share their memories and incorporate knowledge from other intelligent agents then actionable knowledge learned in one location could be transferred to a second location to increase the capabilities of the agent at the second location. Generally, knowledge is learned in detail, and the ability to abstract is a higher-level intelligence function that is not generally ascribed to machine learning. But it is exactly that type of generalized and abstract knowledge along with individualized behaviors that would be helpful in a distributed learning approach. Accordingly, there is a need in the art for distributed machine learning that will share the information and incorporate the information from other intelligent agents, and provide for a distributed diverse array of intelligent agents to develop more robust operational code, and to develop the code in a parallel manner to make the genetic evolutionary process faster. There is a further need in the art for a process that allows parallel execution of the machine learning exploration phase to enhance the speed and breadth of machine learning.

The embodiments herein are designed to address these needs.

SUMMARY

Broadly speaking, an improved system, method, and computer readable medium for distributed machine learning intelligence development are provided. Aspects herein use distributed persisted knowledge bases and build on evolved genetic-program rule lists. First-order predicate logic can also be used to allow re-applicability. Aspects also use ontology-based tagging systems to identify needed knowledge.

The multi-computer distributed system herein joins machine-learning components with simulators and memory persistence systems to provide a distributed learning environment to increase the speed of machine learning of tasks. Knowledge learned from interacting with a real or a virtual environment may be stored and shared with other machine-learning agents. Multiple agents can be learning to perform the same tasks at different locations, using different computer hardware. If the tasks are learned in duplicate virtual environments, then the rules the agents develop to perform the tasks are directly shareable to other duplicate agents. If tasks that are related but not exactly the same are learned by different agents, their rule sets may be shared by ontological abstraction of the classifications of the knowledge and by abstracting the targets of the actions in the rules. The methods developed in different agents becomes genetic material for software genetic recombination to create new programs that incorporate, test, and improve the combined knowledge set.

The embodiments can be implemented in numerous ways, including as a system, a device/apparatus, a method, or a non-transitory computer readable medium. Several embodiments are discussed below.

In an embodiment, a distributed machine learning system is provided, comprising a plurality of distributed learning environments in communication over a network, wherein each environment comprises a computing device having a memory and a processor coupled to the memory, the processor adapted to implement a learning environment via one or more agents in a rules-based system, wherein the agents learn to perform tasks in their respective learning environment; and a persistent storage in which knowledge comprising a plurality of rules developed by the agents for performing the tasks are stored, wherein the knowledge is tagged and shared with other agents throughout the plurality of distributed learning environments.

In another embodiment, a method for implementing the distributed learning environment is provided. A computer program product is also provided that comprises a non-transitory computer-usable medium having a computer readable program code embodied therein, adapted to be executed by a processor to implement the methods herein.

The advantages herein are numerous. One significant advantage is the provision of actionable program pieces that are part of a distributed executable software/robotic entity. Another advantage is the provision of a process and system where the information in a distributed machine learning database can be built by machine learning, where the computers write their own code, categorize it, debug it, improve it, and share it over the entire network of connected Artificial Intelligence (AI) entities. Moreover, it integrates genetic programming, intelligent agents, expert system technology, networking technology, and database technology and allows parallel development of detailed behaviors using large-scale simulators.

Other aspects and advantages will become apparent from the following detailed description taken in conjunction with the accompanying drawings, illustrating, by way of example, the principles herein.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects are obtained, a more particular description briefly described above will be rendered by reference to specific embodiments thereof which are illustrated in the appended drawings. Understanding that these drawings depict only typical embodiments and are not therefore to be considered to be limiting of its scope, embodiments will be described and explained with additional specificity and detail through the use of the accompanying drawings in which.

DETAILED DESCRIPTION

Since the environment in which machine learning systems perform is complex, including the Complex Adaptive System type of environment, setting up the learning environment and having the agent explore it can require a large amount of machine resources. This is also true when it is not a repetitively-performing system that could be parallelized in a Single Instruction Multiple Data type of environment that could be accomplished on a single machine. A solution to this complexity can be achieved by using parallel execution of the machine learning exploration phase as set forth herein. In the manner described herein, the speed and breadth of machine learning will be enhanced. Specifically, parallelism can be exploited by having the intelligent agents learn in separate environments that may be distributed with their own support mechanisms and databases.

Figure 1:
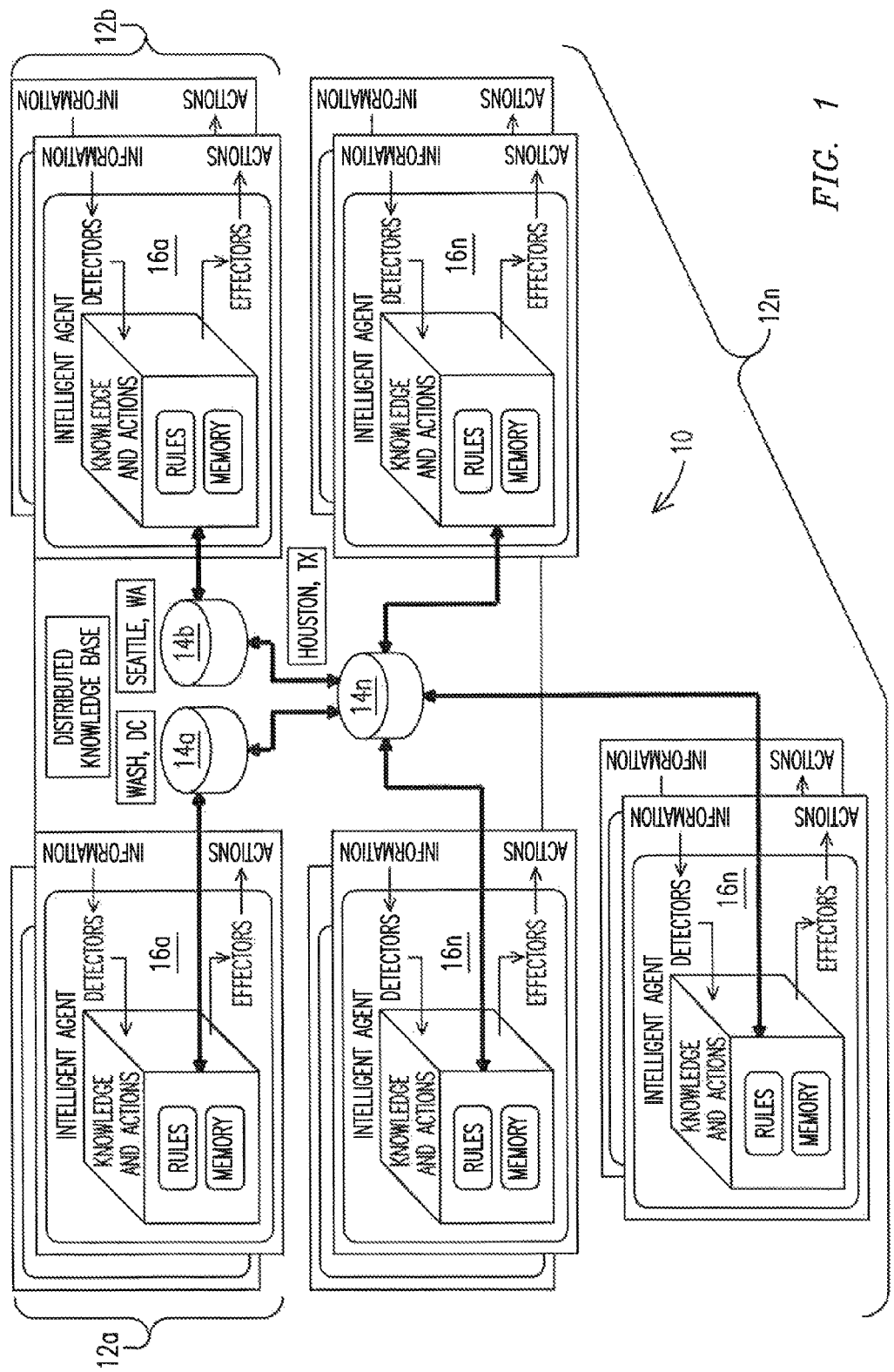
FIG. 1 is a top level illustration of a multi-computer distributed learning system illustrating aspects herein.

An overview of the multi-computer distributed learning system 10 is shown in FIG. 1. The distributed learning system 10 joins learning systems 12a, 12b, . . . 12n, comprising machine-learning components (e.g., machine-learning agents 16a, 16b, . . . 16n) with simulators (not shown) and memory persistence systems (e.g., databases 14a, 14b, . . . 14n) to provide a distributed learning environment/system to increase the speed of machine learning of tasks. Knowledge learned from interacting with a real or a virtual environment may be stored and shared with other machine-learning agents. Multiple agents 16a, 16b, . . . 16n can be learning to perform the same tasks at different locations, using different computer hardware. The agents could also be learning different aspects of tasks at each location.

In operation, if the tasks are learned in duplicate virtual environments, then the rules that the agents develop to perform the tasks are directly shareable to other duplicate agents. If tasks that are related but not exactly the same are learned by different agents, their rule sets may be shared by ontological abstraction of the classifications of the knowledge and by abstracting the targets of the actions in the rules. The methods developed in different agents 16a, 16b, . . . 16n becomes genetic material for software genetic recombination to create new programs that incorporate, test, and improve the combined knowledge set.

Specifically, in the embodiment shown in FIG. 1, learning environments 12a, 12b, . . . 12n, comprise distributed databases 14a, 14b, . . . 14n that are driven by particular agents 16a, 16b, . . . 16n. The agents are learning and enhancing their knowledge and storing it in their particular databases 14a, 14b, . . . 14n. The knowledge and intelligence stored in these databases 14a, 14b, . . . 14n is available to be drawn upon by other agents around the world, and to be copied into their learning systems/environments for evolution into more advanced and effective machine learned and machine-generated software and artificially intelligent responses to a changing system environment.

The intelligent agents 16a, 16b, . . . 16n can store the knowledge that they have developed into an offline database that will persist and allow the knowledge to be reloaded when a similar situation is encountered by that agent or another agent. Thus, rules are distributed in the distributed learning environment 10. In this manner, Artificial Intelligence (AI) evolves at multiple learning or execution sites and is shared for further learning. Best rule lists of different types of Job tags are stored, may be mated with other agent rule lists in genetic processing. It may be applied with less specificity at higher ontological levels of match.

The method and system herein may be implemented in accordance with the teachings of U.S. Pat. No. 6,741,974 "Genetically Programmed Learning Classifier System for Complex Adaptive System Processing with Agent-Based Architecture" (the '974 patent), incorporated herein by reference in its entirety. Using this system, the agents, or characters, are created from an evolutionary-computation-based learning system. However, those of skill in the art will understand that other implementations could also be used without departing from the spirit and scope described herein.

The '974 patent generally describes a system and a method enabling a software agent to learn about its environment, and learn how to perform jobs/tasks. In general, information is assimilated and used in an adaptive manner by the genetically evolving rule set of the agent. The agent learning system communicates with the external environment in an artificial economy through on-line auctions. Internal information also passes through message auctions that provide chaining of rule execution. The agent continually attempts to automatically improve its performance with respect to fitness for a job. The system establishes a virtual world or society inside of the networked computer systems. This virtual world supports the operation and reproduction of mobile, autonomous, software agents. The computers can be distributed throughout a digital communications system.

The combination of agents and the environment is generally termed a Complex Adaptive System. Learning can occur in this Complex Adaptive System (CAS) environment, in a simulator or in real-life. The outside-world information is obtained through environmental interfaces. Such interfaces include, for example, external message board links, mobility controls and reward acceptors. The agent behaviors are in the form of a set of rules that may fire based upon a virtual economy that helps to establish the strength and order of rule firing. The rule strength is joined with sensory information provided by the virtual battlefield or gaming environment to determine the current rules to fire. For example, in order to fire, the individual rule will match and purchase at least one message, on either the internal or external rule list. Rule strength is controlled through adaptation to a complex adaptive system model of the environment that also supplies rewards and punishments.

Figure 2:
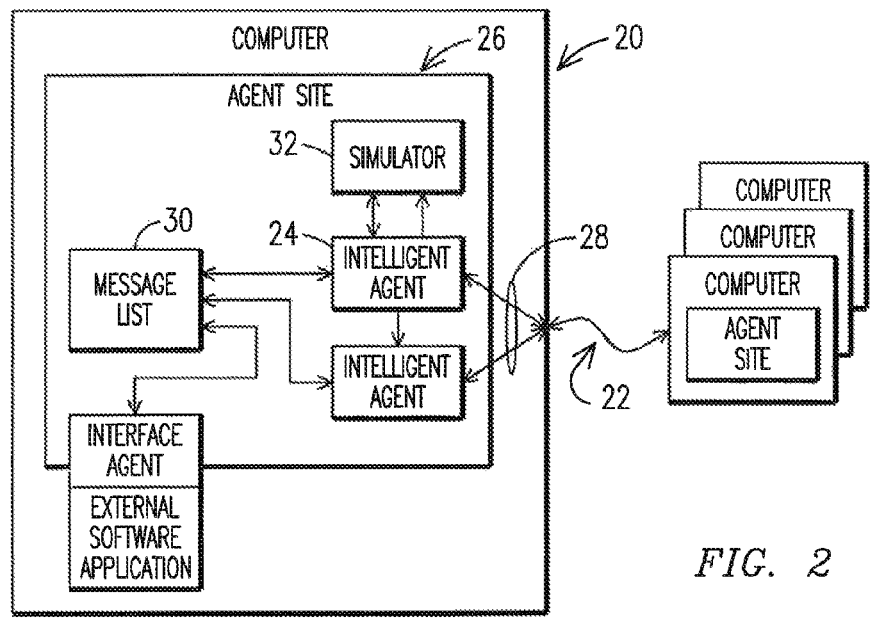
FIG. 2 is a top level illustration of a computer-implemented system that hosts intelligent agents of the prior art.

As illustrated in the detailed example of FIG. 2, a learning classifier system for complex adaptive system processing with agent-based architecture in which the present method and system may be implemented, such as that described in the '974 patent, is illustrated. The system is shown having a plurality of computers 20. The system establishes a virtual world or society inside of the networked computer systems. This virtual world supports the operation and reproduction of mobile, autonomous, software agents. The computers can be distributed throughout a digital communications system, 22 wherein a distributed system allows intelligent agents 24 to traverse the network. At least one agent site 26 is supported on each computer in the plurality. When an agent moves from one site to another, the agent temporarily ceases execution of its program. The site then packages the object code of the agent into an entity which can be transmitted using the protocols and computer-network connection-support software 28. A message list 30 is accessible from all agents in the system. The message list collects payment from agents that purchased a message and distributes payments to agents that posted the purchased messages. Learning and operation of the agents are substantially controlled by an artificial economy and virtual funds. A simulator 32 can be incorporated into the site 26 to enhance learning operations. The agent enters the simulator regularly, both to learn new jobs and to continually train and refine its capabilities.

Figures 3, 5:
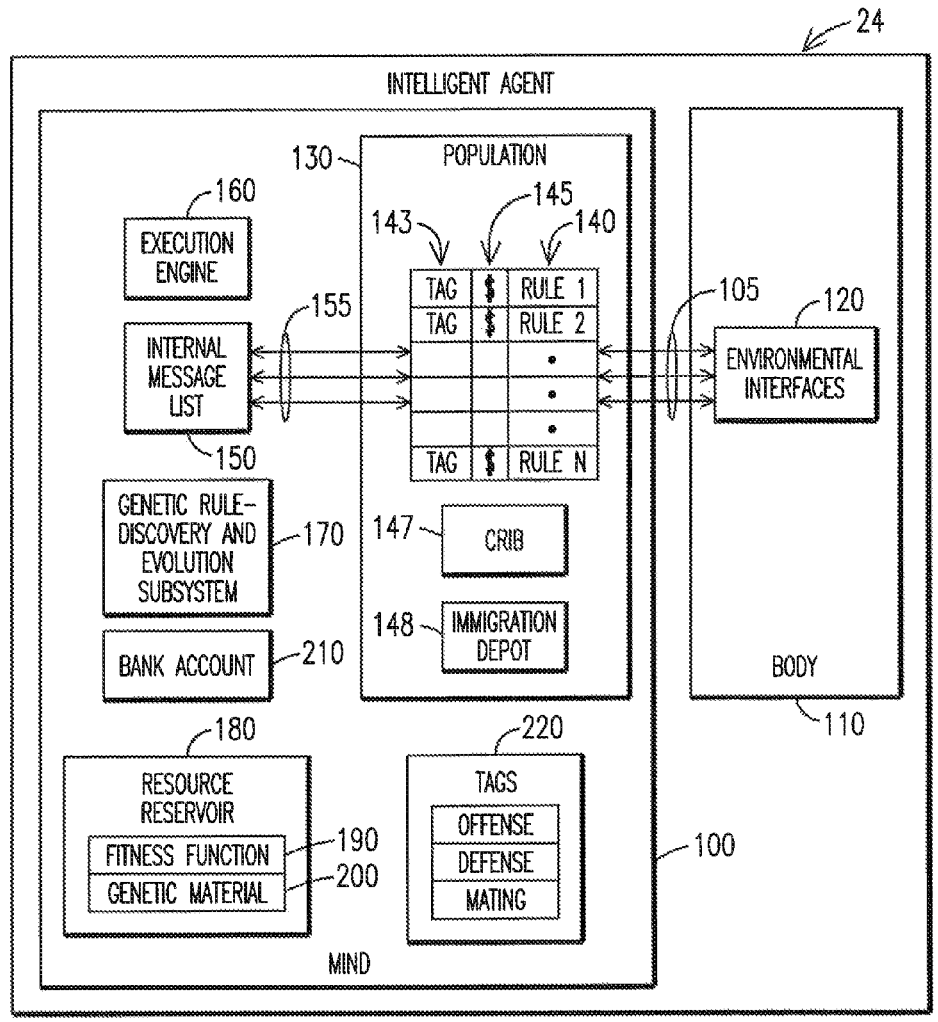
FIG. 3 illustrates an internal structure of an intelligent agent of the type usable in the system of FIG. 2.
FIG. 5 is an example ontology according to aspects herein.

The internal architecture of an agent 24 may also be implemented in accordance with the '974 patent is illustrated in FIG. 3. For descriptive purposes, the agent 26 is split into a virtual mind 100 and a virtual body 110. The virtual mind 100 is the essential intelligence that allows the agent to learn, retain information, and determine actions. The body 110 is a tool for the mind, and provides the capability to execute commands that the mind has issued, and to provide information from the outside world to the mind. The outside-world information is obtained through environmental interfaces 120. During high-speed training, the mind will leave the agent body, and will be linked with a different body in the simulator 32. The simulator body supplies the mind 100 with the same inputs and outputs as the real-world body 110, but executes in the simulator, for increased speed and repetitive training. Using interfaces, the mind 100 is connected 105 to the correct body for either simulated or actual system usage. The agent 24 includes a population 130 of rules 140. The term 'rule' will be used interchangeably with 'individual'. The term population is also interchangeable with 'knowledge base'. The rule base is continually exercised by an execution engine 160. Using a genetic rule-discovery and evolution subsystem 170, the virtual population evolves in a process analogous to a struggle for survival of the fittest in accordance with a predetermined figure of merit.

With reference to the system illustrated in FIG. 3, new individuals are created through simulated, virtual mating of two individuals in the population, or through mutation of a single individual in the population. These individuals are combined and a child offspring is created. The child is stored in the crib 147 until the existing adult individuals are done mating. Migrants are individuals, or rules, that arrive from other agents. Mutants are created by cloning an individual and installing some random changes in the individual's genetic makeup. Incoming migrants are stored in the immigrant depot 148.

Continuing with reference to the system illustrated in FIG. 3, individual rules have tags 143 that indicate the jobs with which the rule is associated. Individual rules in the population have their own performance indicia, or, virtual funds kept in wallets 145. The system also maintains a bank account 210 for the purpose of making internal reward payments. The agent contains an internal message list 150 that is accessed 155 by the rules in the population to buy and sell information between each other. Tags 220 are used to help to indicate that the agent is suited for particular tasks. The agent maintains a resource reservoir 180 that holds essential data items, which may be dynamic to some extent. The fitness function(s) 190 provide the agent with a reference as to how well it is performing the various jobs that it is either learning or executing. The resource reservoir also contains raw genetic material 200 for use in constructing new individuals.

As part of the present system and method, a set of rules work can together to accomplish a job (they may 'speak' a different language, and need to have their terminal expressions translated into that of this agent). The tags may also be elaborated and contrived in an ontological fashion as described in more detail hereafter.

Figure 4:
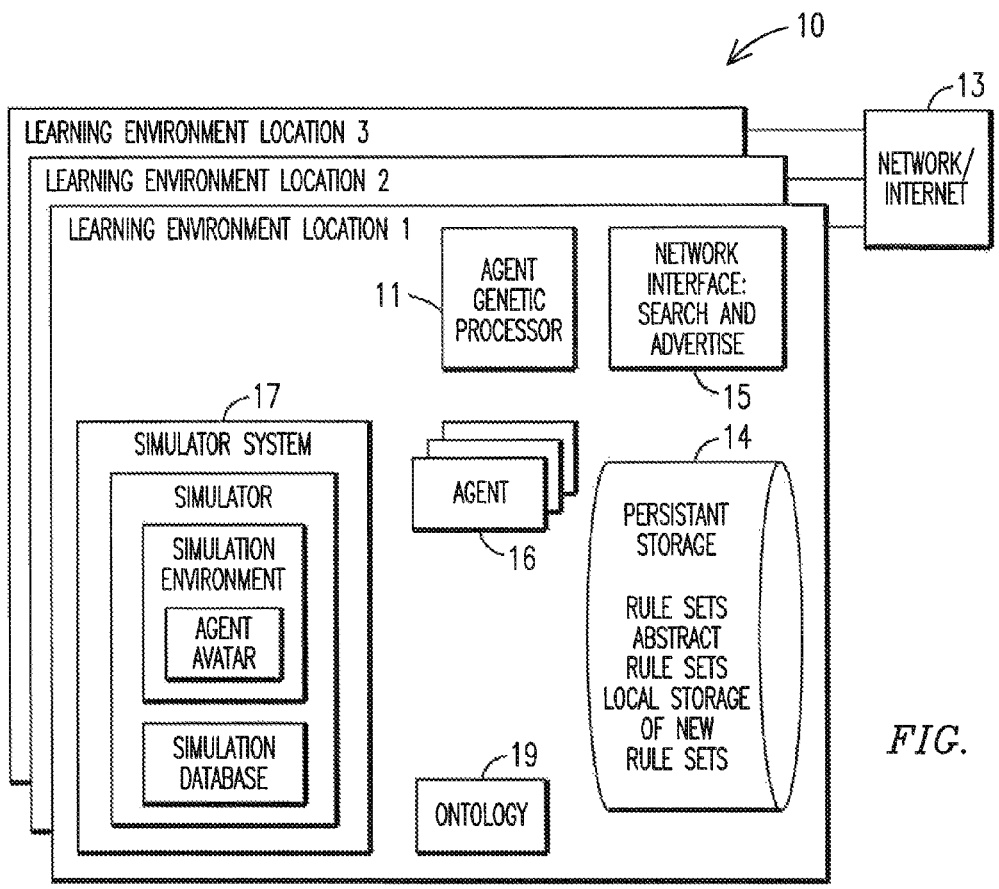
FIG. 4 is a block diagram of a distributed machine learning system illustrating aspects herein.

Turning now to FIG. 4, details of the distributed learning system 10 herein will be described. The distributed learning system 10 comprises distributed learning environments 12a, 12b, . . . 12n, generally at different sites, locations, or computer systems. These distributed learning environments 12a, 12b, . . . 12n are adapted to communicate via a network 13 such as an Intranet or Internet using a network interface 15. Each learning environment comprises a plurality of agents 16 that learn in the environment via an agent genetic processor 11. The knowledge and intelligence learned by the agents 16 is stored in persistent storage such as database 14. A simulator system 17 is provided that comprises, for example, a computer-implemented simulator having a simulation environment and simulation database, including an agent avatar.

In one embodiment, the knowledge learned by the agents 16 stored in persistent storage 14 is tagged and metatagged so that it may be identified, stored and retrieved. For example, these tags could include 'right turn', 'left turn', and a metatag could include 'driving' or a higher level in an ontology of behavior. An ontology 19 provides a structural framework for organizing information by describing the concepts and relationships that can exist for an agent or a community of agents. The knowledge may also be categorized by the type of Artificial Intelligence (AI) that is using it. For instance, an autonomous robot of type 1 may have a different set of learned abilities than an autonomous robot of type 2.

As shown in FIG. 4, there may be multiple agents 16 at a single learning environment site 12 because some simulations can involve multiple agents to interact with in the environment. The agents typically fall into the following categories shown in Table 1 below.

TABLE 1

Agent Type and Behavior

| Agent Type | Behavior |
| --- | --- |
| Non-learning | May perform pre-scripted responses or actions |
| Learning in exploration mode | Actively learning and developing a set of behaviors |
| Learning in exploitation mode | Already has learned the behaviors, may detect performance decreases. |

The non-learning agents are there to interact with the learning agents. They may execute simple if-then response scripts. The exploration-mode agents are actively performing learning. As they complete a task they are rewarded or punished along the way. The goal is to increase the amount of rewards they get and minimize the number of punishments they receive. The rewards and punishments are expressed numerically, and generally thought of as a form of artificial money or fitness.

While a classic genetic-algorithm-type of fitness function may be used as part of the reward system to the agent, the genetic algorithm (GA) reward tends to operate on a single snapshot of the GA result, whereas in an LCS, the agent executes the results of the genetic evolution as a program that exists in an environment to do things and respond to things, more like an executable entity. In order to grade that agent, it can be given reward or punishments as it exists in the environment, in a more natural manner. For instance, if the agent bumps into something it can get a punishment, and if it finds the right path it gets a reward. The agent tends to repeat the actions for which it was rewarded, because those actions are parts of more successful rule lists, having made more money. The other rule lists and behaviors eventually are deleted by the genetic evolution processing. This type of system that interacts with the agent in a local manner, producing rewards and punishments, and is an example of a Complex Adaptive System, as it can also change and the agent that does not change will become less effective.

The agent may also spend money along the way to accomplish the job/task, buying rules and paying taxes. The agents continue to explore the environment and perform genetic operations to search for program snippets that increase the ability to perform parts of the job/task. Each time it is determined that a set of learned rules performs better than the prior set (e.g., receives a higher reward), that set of rules is stored as a Best Rule List (BRL), or the BRL for a certain job/task.

The exploitation-mode agents have already learned how to operate in the environment and perform tasks. They are running a BRL that is the best performing rule list for a certain job/task, but the performance of the rule list may decrease due to changes in the environment that it is operating in, whether real or virtual. An agent in exploitation mode would execute the BRL only, but still get the same rewards and punishments of an actively learning agent. But if it finds a decrease in the reward for that BRL it may need to start exploring the environment to see if it can make a better performing BRL.

In an artificial economy, the agent has a wallet that contains an aggregate amount of money, but during the course of conducting a single job/task will receive a certain amount of money, and that is called the 'differential fitness' and every time the agent does the same job in the same environment, the differential fitness should be the same. If the differential fitness decreases for a given job, then the environment will likely have changed, and the agent will have to learn to do new things, or interact with different parties to start getting the same amount of money that it had been getting. This will require that learning start running again, or the agent may reach out to other agents that have been actively learning all the time in order to get some novel techniques or contact information.

Learning continues, since that is how the agent can experiment with a changing environment, but in order to learn, the agent needs an environment in which it can make mistakes. Therefore, a co-simulation of the environment can be provided where the agent can operate in a faster-than-real-time mode to test out a large amount of fitness-directed and random changes in its rule base. Running in a faster-than-real-time mode can help to get more learning cycles per hour completed, but in order to get more learning per hour accomplished, a parallel computing approach is desired.

A General Purpose Graphics Processor (GPGPU) performs rapid parallel processing but the agent learning system environment is more complex than what may be obviously parallelized in a GPGPU environment that generally applies a single program to multiple sets of data. In this case the data is a program, and each one is different. Thus, to parallelize the learning environments, parallel complex learning environments are required, as provided for herein. Parallel complex learning environments will allow agents to constantly explore the environments to see if they can create better BRLs.

The parallel complex learning environments herein allow for multiple agent simultaneous learning. Multiple agents may learn to cooperatively accomplish a task, or they can learn to be adversarial to each other. Multiple agents require multiple sets of support software although they may share the same hardware if they are operating in the same environment and in the same scenario.

Moreover, duplicate virtual environments are also provided herein. In order to parallelize a learning task, the identical simulation environment is made available to the different learning environments. The tasks are directly shareable. If agents are learning in duplicate environments, then their learned rule lists can be directly shareable. The objects in the environment may be identical at all simulators, the task names and the rewards and punishments may be the same, the same exact task may be used. It should be possible then to grade the entire evolved rule list on a common scale.

For example, the agent at Learning Environment Location 1, LEL1, may have made $1000, while the agent at LEL15 may have made $1012. The agent at LEL1 saves its BRL, as does the agent at LEL15, but the BRL at LEL15 is better than the one at LEL1.

The BRL from LEL15 may be stored in the most basic form, with no ontologic enhancements, even as a binary object, and sent to the agent at LEL1, that would load it in and use it instead of its BRL. Different rule lists corresponding to different jobs may exist in an agent at a time. They are distinguished from each other by the use of tags that indicate what the rule has been used for. Each rule in the rule list also has its own wallet that is used to purchase messages from other rules, and get to run. The financial state of all the rules is maintained in the copy so that the bidding and message purchasing and hence the order of operation of the rules gets preserved. This type of evolution is an All-For-One type of processing. All included simulators try to solve the problem at the same time, thus ideally speeding up the learning problem through parallelization.

In another embodiment, ontological abstractions of knowledge classifications are provided. In an operating agent system, where the machine-learning agents have begun to learn a number of tasks, or even the same tasks in different environments, they can evolve different methods of accomplishing various aspects of the tasks. In the theory espoused by John Holland, the inventor of genetic algorithms and learning classifier systems (binary not the genetically programmed), there is a schema that defines what is good and correct that may be found and carried on by the genetic evolution in the system. Fitness pressure enables the development and preservation of schema in a genetically evolving software system. For instance, if a certain behavior is found to be very helpful in one aspect of the processing of the job/task then that behavior is highly likely to be carried on from generation to generation of the rule list since it helps to make more money and is less likely to be written over by newly arrived rules from other locations or rules that may have been created from the genetic material and the other rules that the agent has.

A schema is an abstract term, and it may flow into abstractions also. For instance, if Agent A is operating in LEL2, and Agent B is operating on a different problem in LEL19. Agent B finds a good way to "carry wheat" using its robot arms and legs. Agent A may need to "transport uranium." So, Agent A sends out a query for any rule lists that deal with "carrying," and gets the BRL from Agent B that does some carrying, albeit for wheat. Agent A may add Agent B's rule list to its own population of rules, tagging it as an external rule list.

Agent A will make a target change of all first order predicates in the rule list from Agent B in order to use tags from the environment in which Agent A is operating. Then Agent A will start testing its new rule list, exploring its potentially-simulated or multiply-simulated environments to see how well the new rule list from Agent B, translated into term that Agent A can understand, works. If there is a snippet of good schema that came in from Agent B, it might pour into the genetic schema of A at some level. It may take a number of evolutionary cycles in Agent A to get the potential schema from Agent B fully tested. Note that the evolutionary processing does not necessarily happen continuously in a given agent (Agent A). Rather, the agent is allowed to operate, adjust its money streams and bidding, make and break connections, and create new rules to satisfy connection needs for responses. This is accomplished using genetic material it has already identified and internalized, similar to thoughts in a 'what are the actors that you know about in your domain' type of ideation that may be encountered when considering knowledge in a human being.

Therefore, if an agent in a different learning environment finds something that works on a slightly different problem, the rules it develops may be "close enough" that they could help on the current problem.

As used herein, a deme is a neighborhood or island of LELs that is separated in some conceptual way from other demes, such that the learning agents in the different demes may develop differently and create different evolutionally-developed behaviors. Thus they might have differently-behaving schemas that may have not been evolved in other demes. As the information is connected through the network/Internet, the ideas and ways of processing, and possibly even the targets, the zero-order concrete actor names in the environments, may be transferred.

For example, bananas are only grown on one island, and it was determined that the concept of 'eating (X)' can produce good fitness if X is replaced by 'banana.' However, the agent in another deme may not know of 'banana.' If the genetic terminal that is 'banana' is replaced by X and X is only set to be a terminal from the faraway deme's knowledgebase, then the knowledge of eating bananas would never transfer as the rule list travels to another deme. To address this situation, the targets/terminals of the rule list from the sending deme are sent as well, even though the terminals may be generalized using first-order predicate logic to be something that the second deme may use more directly. The second deme must be given a chance to try and discard if fruitless, the terminals from the oncoming rule list from the originating deme.

The rule lists in an agent are tagged with words that define what it does. For instance, there might be a rule list that performs "Detect Green Laser Light". There may be useful schemas contained in this rule list, but in order for another agent to request the potential beneficial alien schema it would be helpful to provide a machine-processable abstraction mechanism that allows "matching" of the rule list at some level. The lower down the ontological match goes, then the more specific the match is and the better it would be to integrate that rule list into the agent's own rule list in order to solve the more specific problem. There may be a really high paying rule list elsewhere that is a more general ontological match though that may be does a special more efficient search, but not necessarily for laser lights that are green. It would be good to have access to that capability, but it might be weighted less in the choice function that grabs the alien rule lists for integration because the choice function may be weighting more specific solutions higher. The specificity of solutions can be controlled, similar to the way that the fitness was controlled in the '974 patent in the use of the oscillating sigma-truncation mechanism to change the amount of elitism in the mate selection in the genetic programming from highly selective to more diverse. In this case, the specificity could be oscillated from highly selective to more diverse also in order to help incorporate different learned techniques in the adaptive agent's rule list, to try to improve fitness, or to get the job done at all.

The ontology could be any advanced ontology that is sufficiently detailed to represent all of the universe of discourse present in both demes. The ontology illustrated in FIG. 5 is weighted such that some of the closer choices have a higher score indicating the level of match of the capabilities between the desired and the available rules lists. For example, the verb "Detect" has a higher score ($35) than does "Find" ($30), "Look" ($20), and "Do" ($10) in the list.

There are two situations to consider with regards to the distributed learning capabilities herein. The first, and the easiest, is that of distributed learning of the exact same thing. The second style is that of taking advantage of what has been learned and stored to add to the knowledge of the agent. For instance, if the agent needs to know how to do a job/task it may obtain many rule lists that correspond to various aspects of the job/task and fuse them into an interoperable whole using genetic evolution and the information stored in the job/task description.

Figure 6:
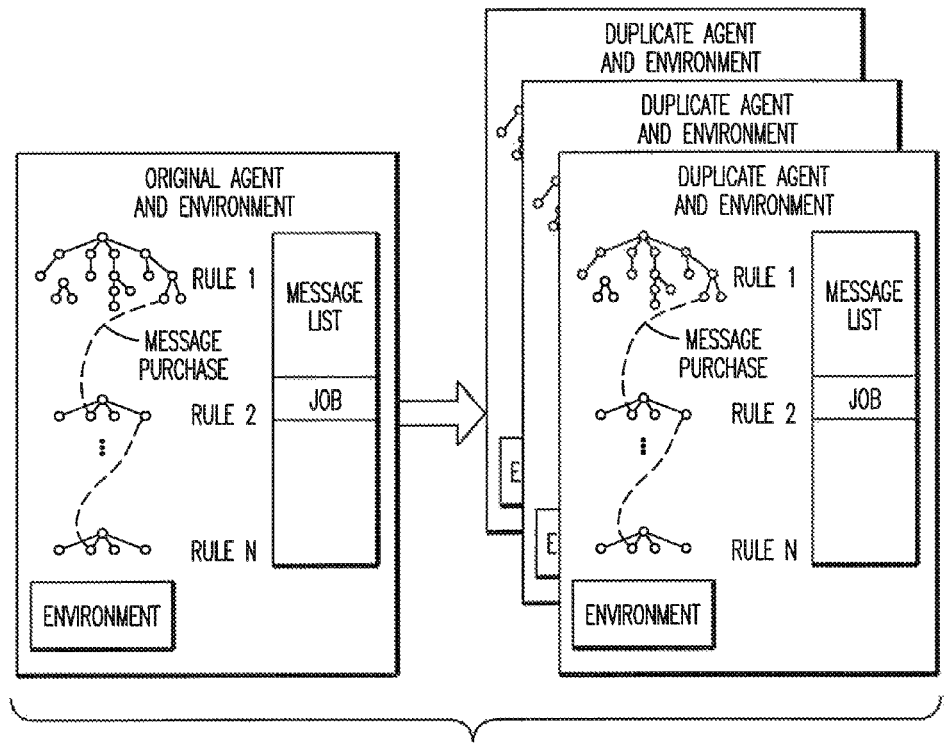
FIG. 6 illustrates a scenario with distributed agents learning the same task.

For the first style of learning, where distributed agents learn essentially the same task, the agent is copied and different copies are sent to learn the same thing in different environments. Instead of doing this learning serially and repetitively in the same environment, the learning is accomplished in parallel, in multiple environments. The environments may be simulated environments if it is possible to simulate the needed effects with a suitable level of fidelity. Then as agents learn better and better ways to perform the job, their rule sets may be shared and incorporated in other agents to use either as their main rule list for this job or as genetic material that may be incorporated and mutated in an attempt to find an even better performing solution. This type of learning is shown in the FIG. 6 where agent learning is performed in parallel, working on essentially the exact same problem, starting from duplicate conditions. For each of the duplicated agents and their learning environments, there could be many computers involved to support the process.

The second type of learning involves learning from experience, and from the experience of other agents that have solved problems. Learned solutions are stored in shareable databases that may be geographically distributed. While agents may be continually processing and identifying needs for new information, the concept of assimilating external information, or thought transference learning, will be described from the aspect of obtaining appropriate knowledge to do a job/task. After the knowledge aspects are obtained, then the agent can go about working the knowledge chunks into a workable system. It may use learning of type 1 (where distributed agents learn essentially the same task) to speed the evolution of a working system. After the system is working it can be stored in persistent storage for later use and assimilation by other agents for other jobs.

A key aspect to the agent system is the concept of the "Job." The Job provides both the description and some of the monitoring functions for the agent performance. The description of the Job is very detailed semantically in order to help find appropriate remote rule lists that may help the agent to perform the Job. It also provides a means to allow the agent to learn if it has successfully learned the Job. The Job carries a schema of what the Job is, represented by the fitness function that allows the agent to learn the meanings of the semantic concepts contained in the ontology of words that are used to describe the aspects of the Job. This schema is an abstract concept that embodies a goal thread, a reason, a plan, and an expectation of what it is that needs to be done. The agent can learn to associate the words that are used to describe the Job with what it can sense from the environment in relation to processing the Job.

As an example Job, consider providing a Job to an intelligent agent embedded in a robot, or controlling a robot, to "go outside, down the driveway, pick up the newspaper, and bring it back." The newspaper may not always be in the same place, and there may be obstacles in random locations. The agent needs a rule list that controls that particular brand of robot. The robot may have been trained to walk using genetic algorithms, and have a rule list that controls its movement. Thus, one of the set of tasks that the agent has to obtain is that of movement.

There is a retrieval cue for the memory to find, which is that the information has to apply to this particular robot for the rules that control the hardware to make the robot move. These rules should have been learned by the robot such that they allow a certain interface to process in response to a Job, or subJob, for instance to move forward. The rule set that defines the robot motion could have be hard-coded into the robot control subsystem, but then if something happens, such as the loss of one of the robot's legs or wheels, the system cannot evolve to continue to accomplish the Job through different control means.

There are other aspects of the Job that are accomplished also, and these aspects are coded into the Job, ideally using words from a hierarchy or ontology that can be recognized by a talent scout application that takes the Job description and finds chunks of rule lists that can match up with the needs of the Job. It could also start a training campaign, or request that one be instantiated if there is no pre-existing rule list that can handle certain aspects of the Job. Ideally, the aspects of the Job will be categorized to permit faster retrieval and more effective match with external rule lists. Actions may be separated from things, for instance.

A Job description can be of the form shown in Table 2 below:

TABLE 2

Trait 1 <of category A>
  SubTrait1
  SubTrait2
    Sub SubTrait1
Trait2 <of category A>
  SubTrait1
  SubTrait2
Trait3 <of category B>
  SubTrait1
    Sub SubTrait1
  SubTrait2

This Job description along with general descriptions of the Job and the environment can be used to find the right behaviors to bring in from the external stored rule lists.

For instance the Job list can be represented as the following in Table 3:

TABLE 3

| Job List | | | |
|---|---|---|---|
| Trait 1 | SubTrait1 | Subtrait2 | SubSubTrait1 |

In an ontology, these traits may have more general representation, just as moveForward may be more generally specified as Move. Depending on how low in the ontology the individual traits are, the resulting representation may be created. It may be created, for example, in an external Talent Agent module using a Tag Mediator subsystem. This more general representation is shown in Table 4 below:

TABLE 4

Job List General Representation

|  |  | More General Subtrait1 | More General Subtrait2 |  |
| --- | --- | --- | --- |
| General Trait 1 | General SubTrait1 | General Subtrait2 | General SubSubTrait1 |
| Trait 1 | SubTrait1 | Subtrait2 | SubSubTrait1 |

Figure 7:
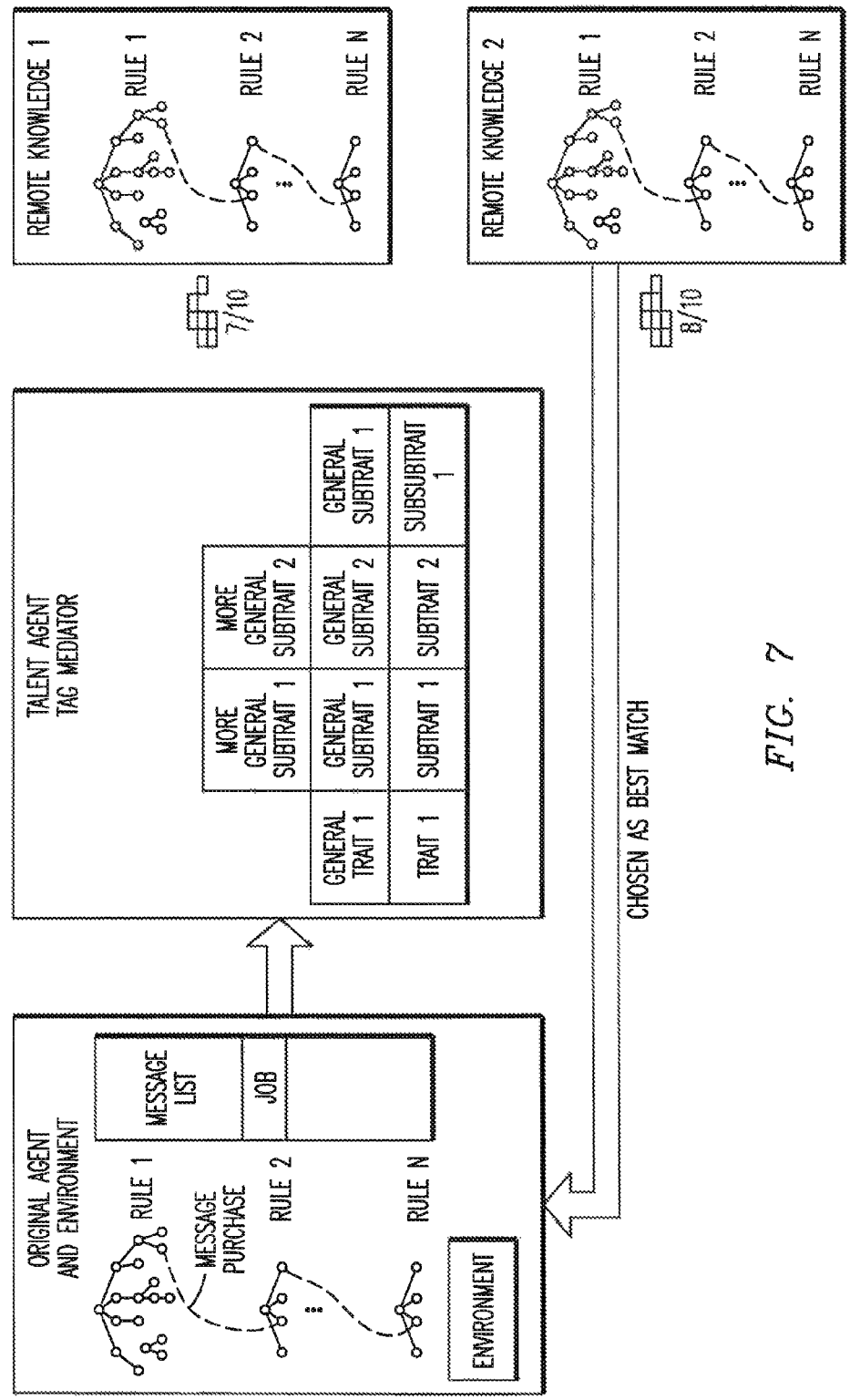
FIG. 7 illustrates a scenario to find the best match from remote knowledge.

These traits may be compared with the trait advertised by the available rule sets in the database system. Then the Talent Scout agent may use a Tag Mediator to find the appropriate match, as shown in FIG. 7. As shown in FIG. 7, remote knowledge having the better match to the desired traits is chosen. The Talent Agent Tag Mediator accepts the tag information from the Original Agent, for one aspect of the Job. It then searches appropriate stored knowledge for helpful rule lists that may assist in the processing of the Job. The traits shown in the tag list from the Original agent is expanded up in ontologically more abstract levels for each of the traits and subtraits. Rule sets that have capability tags that match the most specific of the Original Agent Job tags are chosen for copying into the Original agent. There are many ways to determine the proximity of the remote Rule List capability matrix to that desired and indicated by the Job, or the abstraction of the Job. Fuzzy logic can be used to measure a fuzzy distance from the requested tag to the available tag.

Some of the ontology expansions may be weighted to show that it might be a bigger leap to make one generalization versus some other generalization leaps; the bigger the leap, the lower quality of a match. For instance the leap from a 'Ford' to a 'Car' would be smaller in cost than the leap from calling a 'Ford' a 'Thing'.

The more abstract the Job requirements have to be made, the lower the score that the remote rule list may get. For instance, in FIG. 7, "Remote Knowledge 1" only matches at 7 out of the possible 10 levels of generalization, where the tag attempts are either the original tag or the new tag, but "Remote Knowledge 2" matches at 8 of the 10 possible levels of generalization, and is thus a better match to the needs of the Job, and will be copied into the rule set of the original agent.

There may be some fitness functions associated with the oncoming rule lists. These would help the rule lists run correctly, and would be integrated into the original agent's set of fitness functions. There would also be the subJob tags that the oncoming rule list responds to, and the raw genetic material that is part of the terminals, or leaf nodes, of the rule set.

After the original agent gets all the external knowledge that may be needed to process the Job, it starts to test the Job in the environment, ideally a simulated environment first. It also starts to perform genetic evolution to better integrate the new rule lists into a cohesive agent.

Figure 9:
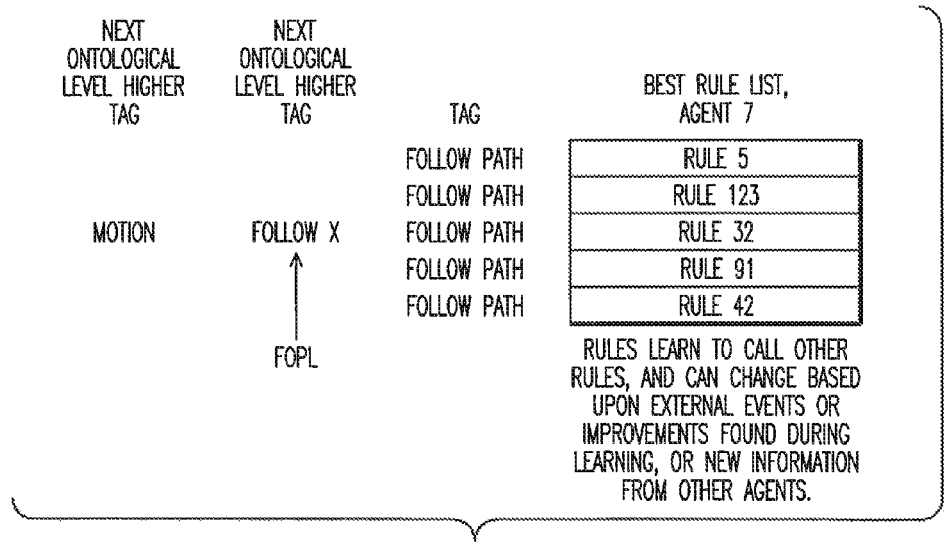
FIG. 9 illustrates ontological levels using tags.
Figure 8:
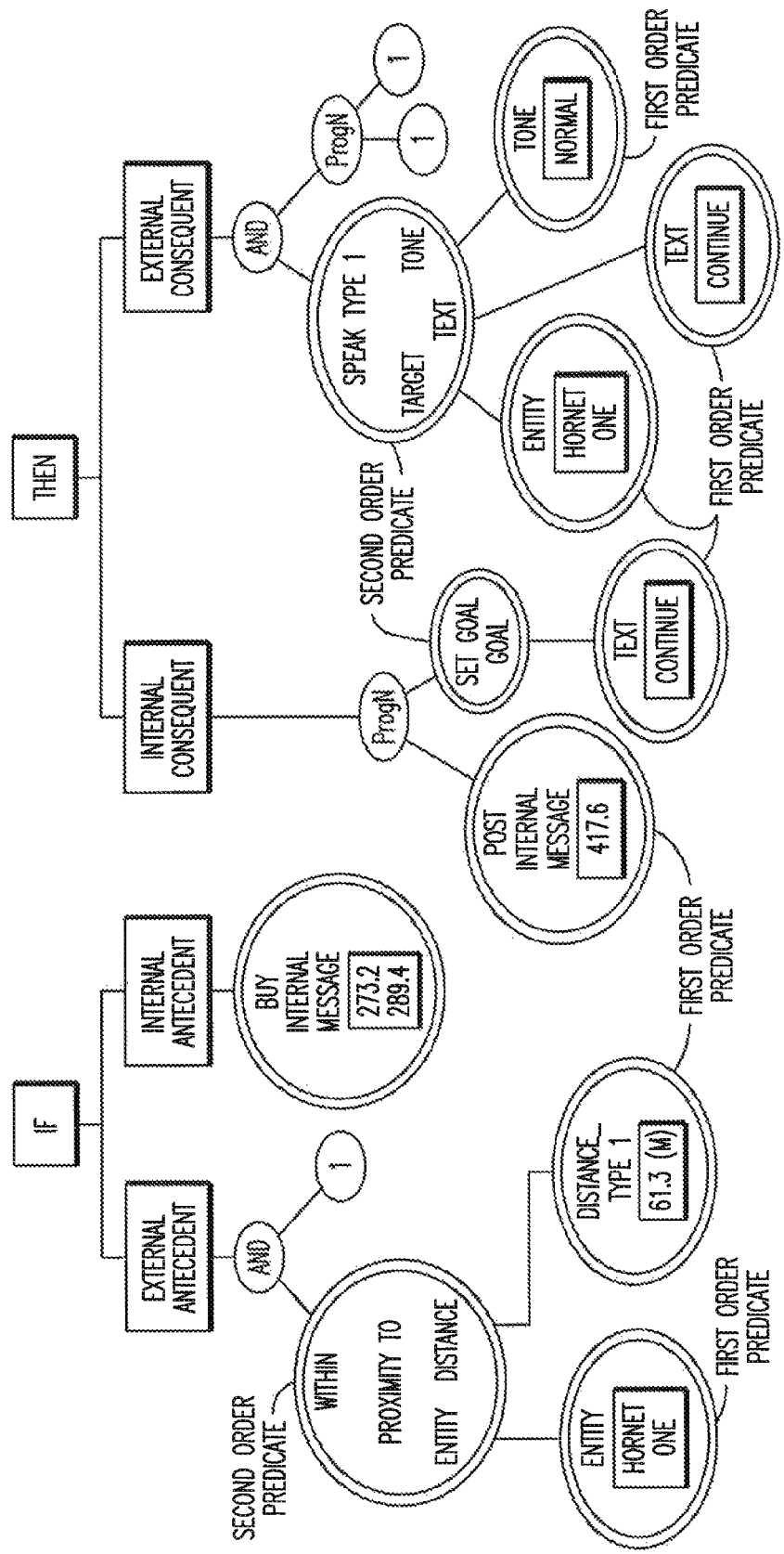
FIG. 8 illustrates an example internal rule with first and second order predicates.
Figure 10:
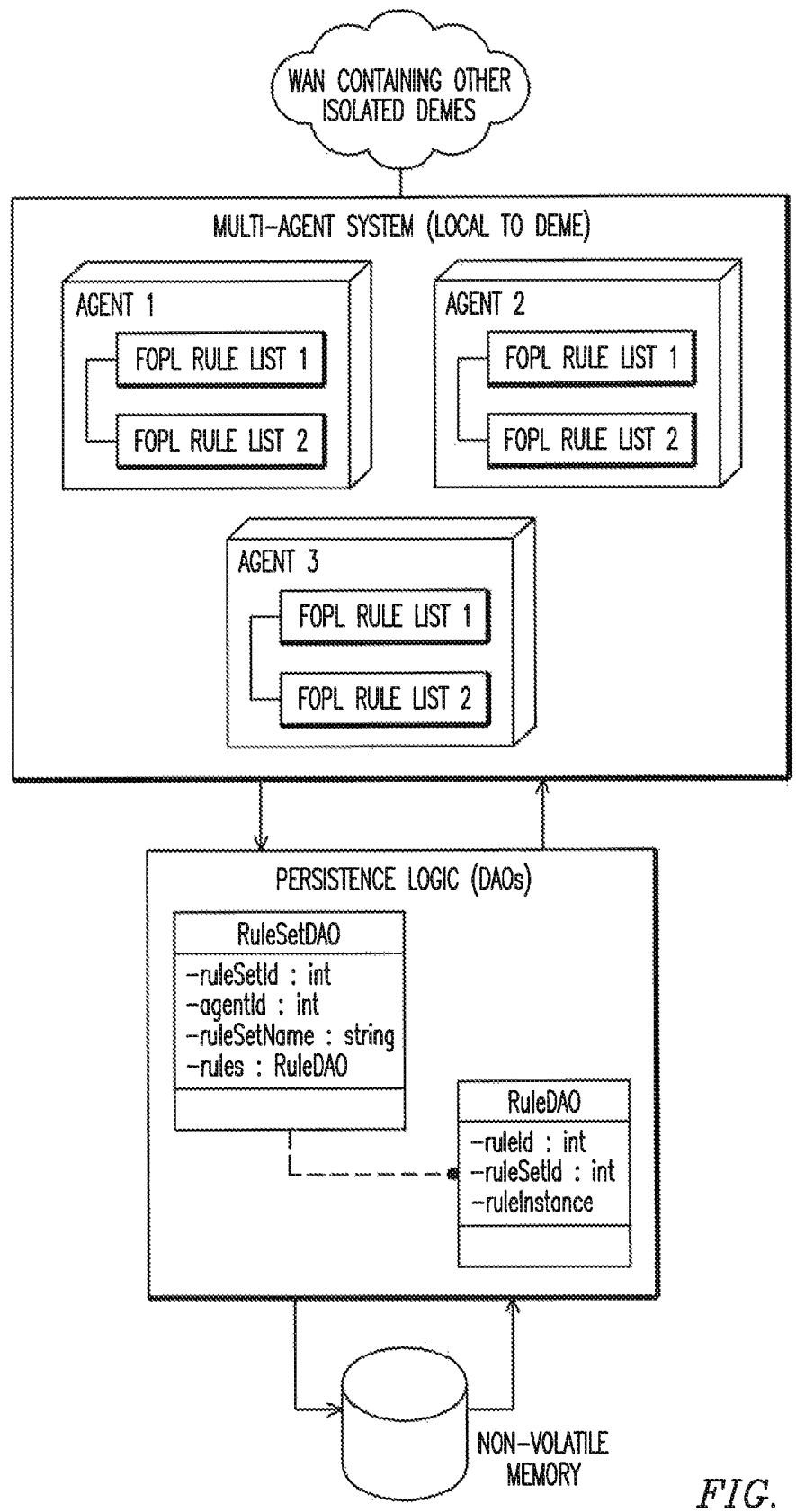
FIG. 10 is a block diagram of the multi-agent system with persistence logic.

Turning to FIGS. 8-10, in certain embodiments the knowledge stored in the distributed databases 14a, 14b, ... 14n, may be stored using a first-order-predicate logic FOPL representation for leaf nodes that represent the particular items in the environment, such as 'car5' or 'bogie7', as a generic predicate such as car or bogie. The FOPL representation allows the machine-learned (ML) software programming to apply in different circumstances for different AI ML entities. It also allows the knowledge to be shared into the knowledge-base of actively learning or performing AI agents, so that the knowledge can be further tested and refined and distributed.

Agent rule lists (represented in FOPL) may be encoded as rule Data Access Objects, DAOs (FIG. 10). The rule DAOs extend a common class (for uniformity among first-order terms, such as constants, functions, variables, predicates, connectives, quantifiers, etc., and ease of persistence), but the logic rules contained within the class are "automatically programmed" (generated) during MAS Multi-Agent System runtime. Agents store all rule "chains" (not just what is considered the best rule lists) so that history of evolutionary steps are recorded. As such, each rule DAO is contained in a single rule set DAO. There is a one-to-one mapping between agents and rule sets. The rule set DAO maps to a rule set table in the database, uniquely identified by the agent to which it corresponds. There is a one-to-many mapping between the rule set table and rule table (populated via the rule DAO). Rows in the rule table are uniquely identified by the rule set of which they are a part and contain rule saliency (if applicable), predicates, and conditions.

Computer program code for a processor to carry out operations of the method described above may be written in a high-level programming language, such as Java, C or C++, for development convenience, or other programming languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present method is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile/video disc (DVD). The code can be configured for use in a computer or computing device which includes a memory, such as a central processing unit (CPU), a RAM and a ROM as well as a storage medium such as a hard disc.

The "step-by-step process" for performing the method herein is a specific algorithm, and may be shown as a mathematical formula, in the text of the specification as prose, and/or in a flow chart. The instructions of the software program create a special purpose machine adapted to carry out the particular algorithm. Thus, in any means-plus-function claim, or functional claiming, herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present method creating a new machine. The general purpose computer becomes a special purpose computer once it is programmed to perform particular functions pursuant to instructions from program software/code herein. The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It should be understood that the examples and embodiments described herein are for illustrative purposes only and that various modifications or changes in light thereof will be suggested to persons skilled in the art and are to be included within the spirit and purview of this application.

What is claimed is:

1. A distributed machine learning system, comprising:
a plurality of distributed learning environments in communication over a network, wherein each environment comprises:
   a computing device having a memory and a processor coupled to the memory, the processor adapted to implement a learning environment via one or more agents in a rules-based system, wherein the agents learn to perform tasks in their respective learning environment to develop knowledge;
   a storage in which knowledge comprising a plurality of rule sets developed by the agents for performing the tasks are stored, wherein the knowledge is tagged to facilitate identification, storage and retrieval;
   an ontology that is weighted to provide, in response to at least one request by the one or more agents, classification of at least a close choice of knowledge to share rule sets developed by the agents in the plurality of distributed learning environments for implementing tasks which are related, but not necessarily the same so that matched parts from the at least close choice of the knowledge provided from at least one sending agent is included with an unmatched part of the rule sets of at least one requesting agent, wherein the at least close choice of knowledge comprising a highest score indicating a level of match of the capabilities between a desired and an available rules lists and providing classification comprises tagging the knowledge with words that define what it does using an ontology-based tagging system;
   an interface for sharing at least one of the tagged knowledge and the at least close choice of knowledge with other agents throughout the plurality of distributed learning environments when the at least one requesting agent requests at least one of the tagged knowledge and the close choice of knowledge.

2. The distributed machine learning system of claim 1, wherein the processor is a genetic processor adapted to implement the learning environment to provide a genetically evolving set of rules for each of the agents.

3. The distributed machine learning system of claim 1, wherein the learning environment is a Complex Adaptive System.

4. The distributed machine learning system of claim 1, further comprising a simulator to provide simulations to facilitate learning in the learning environment.

5. The distributed machine learning system of claim 1, wherein the plurality of distributed learning environments comprise one or more duplicate learning environments for parallel learning of tasks, wherein the rule sets developed by the agents for implementing the tasks that are substantially the same are adapted to be directly shareable to other agents in the one or more duplicate learning environments.

6. The distributed machine learning system of claim 1, wherein the matched parts from the at least close choice of the knowledge is included with an unmatched part of the rule sets of the at least one requesting agent to provide for a new rule sets.

7. The distributed machine learning system of claim 1, wherein the knowledge is also metatagged with one or more higher levels in an ontology of behavior.

8. The distributed machine learning system of claim 1 wherein the processor is adapted to provide an ontological abstraction of the classifications of the knowledge encoded in the rules that is at least a close choice of the knowledge sought.

9. The distributed machine learning system of claim 1, wherein the processor is adapted to provide an abstraction of targets of actions in the rules.

10. The distributed machine learning system of claim 1, wherein at least some of the agents are adapted to actively learn by receiving rewards or punishments as they complete a task with a goal to increase rewards and minimize punishments.

11. The distributed machine learning system of claim 1, further comprising a Best Rule List (BRL) stored for a set of learned rules that performs better than a prior set for a certain task.

12. The distributed machine learning system of claim 11, wherein at least some of the agents are adapted to execute the Best Rule List and explore the learning environment in an attempt to find a better Best Rule List.

13. The distributed machine learning system of claim 12, wherein an agent learns the environment by sending out a query to other agents in the distributed learning environments requesting any rule lists that deal with a task or a part of a task.

14. The distributed machine learning system of claim 1, further comprising a talent scout application adapted to use a task description for a desired task and the tagged knowledge to find partial or whole rule lists that are suitable for the desired task.

15. The distributed machine learning system of claim 14 wherein the talent scout application is adapted to generalize tags to find partial or whole rule lists that are suitable for the desired task.

16. The distributed machine learning system of claim 1, wherein the processor is adapted to use higher ontological levels of match with less specificity to find partial or whole rule lists that are suitable for a desired task.

17. The distributed machine learning system of claim 1, wherein the knowledge is stored using a first-order-predicate logic FOPL.

18. The distributed machine learning system of claim 1, wherein learning and operation of the agents are substantially controlled by an artificial economy and virtual funds.

19. A method for implementing a distributed machine learning system across a plurality of distributed learning environments in communication over a network, comprising:
   implementing, via a processor of a computing device, a learning environment via one or more agents in a rules-based system, wherein the agents learn to perform tasks in their respective learning environment to develop knowledge;
   tagging and storing knowledge comprising a plurality of rule sets developed by the agents for performing the tasks; and
   providing, in response to at least one request by at least one requesting agent, classification of at least a close choice of knowledge with a weighted ontology to share rule sets developed by the agents in the plurality of distributed learning environments for implementing tasks which are related, but not necessarily the same so that matched parts from the at least close choice of the knowledge provided from at least one sending agent is included with an unmatched part of the rule sets of the at least one requesting agent wherein the at least close choice of knowledge comprising a highest score indicating a level of match of the capabilities between desired and available rules lists, and providing classification comprises:
- tagging the knowledge with words that define what it does using an ontology-based tagging system;
- providing access to the at least one of tagged knowledge and the close choice of knowledge to allow for sharing with other agents throughout the plurality of distributed learning environments when the at least one requesting agent requests at least one of the tagged knowledge and the close choice of knowledge.

20. A non-transitory computer readable medium containing instructions for implementing a distributed machine learning system across a plurality of distributed learning environments in communication over a network, the instructions when executed cause a processor to:
- implement a learning environment via one or more agents in a rules-based system, wherein the agents learn to perform tasks in their respective learning environment to develop knowledge;
- tag and store knowledge comprising a plurality of rule sets developed by the agents for performing the tasks;
- provide, in response to at least one request by at least one requesting agent, classification of at least a close choice of knowledge with a weighted ontology to share rule sets developed by the agents in the plurality of distributed learning environments for implementing tasks which are related, but not necessarily the same so that matched parts from the at least close choice of the knowledge provided from at least one sending agent is included with an unmatched part of the rule sets of the at least one requesting agent, wherein the at least close choice of knowledge comprising a highest score indicating a level of match of the capabilities between desired and available rules lists, and provide classification comprises:
- tag the knowledge with words that define what it does using an ontology-based tagging system; and
- provide access to the at least one of tagged knowledge and the close choice of knowledge to allow for sharing with other agents throughout the plurality of distributed learning environments when the at least one requesting agent requests at least one of the tagged knowledge and the close choice of knowledge.

\* \* \* \* \*